Aug. 26, 1947.  C. W. DYER  2,426,299
CHANGE SPEED MECHANISM FOR LATHES
Filed July 9, 1945
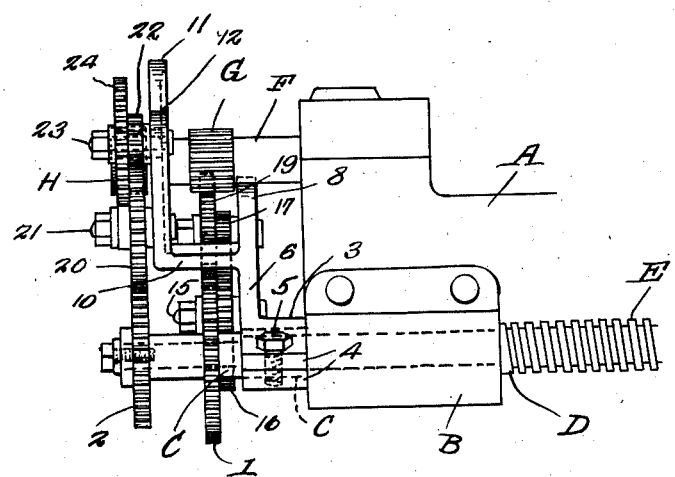
Fig.1
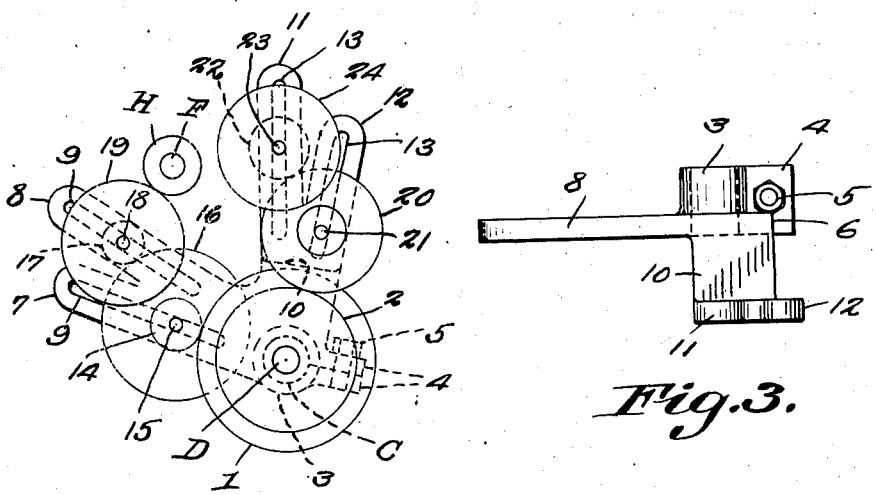
Fig.2.
Fig.3.
C. W. Dyer
INVENTOR.
BY
ATTORNEYS.

Patented Aug. 26, 1947

2,426,299

UNITED STATES PATENT OFFICE 2,426,299

CHANGE-SPEED MECHANISM FOR LATHES

Charles W. Dyer, Stratton, Maine

Application July 9, 1945, Serial No. 603,911

2 Claims. (Cl. 82—26)

This invention relates to an attachment for lathes whereby the speed of the feed screw can be changed to meet different requirements. For example it is necessary, on some jobs, to turn the work, during which operation the feed screw should travel at one speed. Thereafter, on the same job, it might be necessary to thread the work in which case the speed of the feed screw would have to be changed. Heretofore this change from one speed to another has necessitated the removal of one or more gears and their replacement by other gears and this has involved a considerable loss of time and, consequently, an increase in cost of production.

The present invention has for its object the provision of means whereby when a change of speed is to be made, it is merely necessary to shift the transmission mechanism bodily from one position to another whereupon the change is effected quickly and without requiring the services of a highly skilled mechanic.

With the foregoing and other objects in view which will appear as the description proceeds, the invention resides in certain features of construction and combinations of parts and in certain steps of the method hereinafter more fully described and pointed out in the claims, it being understood that various changes may be made within the scope of the invention without departing from the claims appended hereto.

In the accompanying drawing the preferred form of the invention has been shown.

In said drawing:

Figure 1 is an elevation of a portion of one end of a lathe equipped with the present improvement.

Figure 2 is a face view of the shiftable transmission as viewed from the left of Fig. 1.

Figure 3 is a plan view of the carrier for supporting the shiftable gears of the transmission.

Referring to the figures by characters of reference A designates a portion of a lathe having the usual bearing B with a projecting sleeve C which cooperate to receive one end portion of a shaft D, said shaft being provided with the usual threaded portion E so as to constitute a feed screw. The terminal portion of this shaft projects beyond the sleeve C and is provided with spaced gears 1 and 2 of different diameters. Both of these gears are adapted to rotate with the shaft so as to constitute driving elements.

Mounted on the projecting sleeve C is a split collar 3 having projecting spaced bars 4 engaged by a bolt 5 whereby the collar can be clamped tightly on the sleeve C after being adjusted annularly relative thereto. Extended from the collar 3 is a web 6 from which is extended a pair of diverging fingers 7 and 8 each of which has a longitudinal slot 9. A laterally extended bracket 10 is made integral with the web and carries a pair of diverging fingers 11 and 12 each of which is formed with a longitudinal slot 13. The two sets of fingers carry separate trains of gears. One of these sets comprises a small gear 14 in mesh with gear 1 and mounted on a shaft 15 which is adjustably mounted in the slotted finger 7. Rotatable with this gear 14 on its shaft 15 is a larger gear 16 which, in turn, meshes with a small gear 17 carried by a shaft 18. This gear is rotatably and adjustably mounted on the slotted finger 8 together with a large gear 19.

The other train of gears includes a gear 20 which meshes with gear 2 and is rotatable on a shaft 21 adjustably mounted in the slotted finger 12. This gear 20 meshes with a gear 22 rotatable on a shaft 23 which is adjustably mounted in the slotted finger 11 and carries a second gear 24. The lathe is provided with the usual spindle F to which are secured gears G and H and these gears are located in the area defined by the gears 19 and 24. Gear G is positioned where it can be engaged by gear 19 while gear H is located where it can be engaged by gear 24.

The axes of rotation of the gears 19 and 24 are spaced apart a sufficient distance to permit bodily movement of the trains of gears relative to the spindle F so as to bring either of said gears 19 and 24 into mesh with the gears G and H respectively.

When it is desired to set up the mechanism for the purpose of cutting the work, the bolt 5 is loosened and the carrier formed by collar 3, web 6 and the two sets of fingers, can then be swung upon the sleeve C so as to bring gear 19 into mesh with gear G. Thus operation of the lathe will result in transmission of rotation between spindle F and screw shaft D at the speed most desired for a cutting operation. After the work has been properly turned and it is desired to thread it, the bolt 5, which has been tightened on the sleeve C is loosened, the carrier is swung in the opposite direction to bring gear 24 into mesh with gear H and the bolt 5 is again tightened. Thus motion will be transmitted at a different speed between spindle F and shaft D. This latter speed being the one required to effect the desired cutting of a thread. Obviously at the beginning of a job the gears in the two trains can be changed to effect the proper ratios for the successive cutting and threading operations, but after they have once been set up on the carrier said carrier can be shifted successively from one position to the other for the purpose of effecting the successive operations of cutting and threading. In other words, only one setting of the gears is necessary prior to a job for the purpose of producing different speeds of the feed screw and thereafter all that is required is to shift the carrier from one position to another as already explained.

What is claimed is:

1. The combination with the spindle and feed screw of a lathe or the like, of a carrier annularly adjustable relative to the feed screw, separate gears on the spindle, separate gears rotatable with the feed screw, and separate trains of gears mounted on the carrier and shiftable therewith to separately couple the gears on the spindle to the respective gears of the screw shaft.

2. The combination with a spindle and screw shaft of a lathe or the like, separate gears on and rotatable with the spindle and separate gears on and rotatable with the screw shaft, of a carrier annularly adjustable relatively to the screw shaft, separate trains of gears mounted on the carrier and in constant mesh with the respective gears on the screw shaft, said carrier being mounted to tilt in one direction to operatively connect one train of gears with one gear on the spindle and in the opposite direction to operatively connect the other train of gears with the other gear on the spindle, and means for securing the carrier against movement when in either of said positions.

CHARLES W. DYER.

REFERENCES CITED

The following references are of record in the file of this patent:

UNITED STATES PATENTS

| Number | Name | Date |
|---|---|---|
| 698,008 | Gordon | Apr. 22, 1902 |
| 494,383 | Perrigo | Mar. 28, 1893 |

FOREIGN PATENTS

| Number | Country | Date |
|---|---|---|
| 24,201 | Great Britain | 1909 |
| 25,519 | Germany | June 2, 1883 |